(12) United States Patent
Beck

(10) Patent No.: US 12,531,259 B2
(45) Date of Patent: Jan. 20, 2026

(54) METHOD AND DEVICE FOR PRODUCING A FUEL CELL STACK BY CONVEYING FUEL CELL LAYERS ALONG BELTS VIA OVERHANGS

(71) Applicant: AUDI AG, Ingolstadt (DE)

(72) Inventor: Wolfgang Beck, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 376 days.

(21) Appl. No.: 18/004,428

(22) PCT Filed: Oct. 25, 2021

(86) PCT No.: PCT/EP2021/079457
§ 371 (c)(1),
(2) Date: Jan. 5, 2023

(87) PCT Pub. No.: WO2022/090114
PCT Pub. Date: May 5, 2022

(65) Prior Publication Data
US 2023/0299327 A1 Sep. 21, 2023

(30) Foreign Application Priority Data
Oct. 28, 2020 (DE) .................... 10 2020 128 269.9

(51) Int. Cl.
*H01M 8/2404* (2016.01)
*B65G 57/32* (2006.01)

(52) U.S. Cl.
CPC .......... *H01M 8/2404* (2016.02); *B65G 57/32* (2013.01)

(58) Field of Classification Search
CPC ............................ H01M 8/2404; B65G 57/32
(Continued)

(56) References Cited

U.S. PATENT DOCUMENTS

| 2007/0271770 | A1* | 11/2007 | Fujiki | ................. | H01M 8/0271 29/730 |
| 2008/0138185 | A1* | 6/2008 | Maing | .................... | B65G 57/00 414/788.1 |
| 2019/0237272 | A1* | 8/2019 | Nishihara | .............. | H01G 11/82 |

FOREIGN PATENT DOCUMENTS

| DE | 102015220399 A1 | 12/2016 |
| DE | 102018116057 A1 | 1/2020 |

(Continued)

OTHER PUBLICATIONS

International Search Report, mailed Feb. 4, 2022, for International Patent Application No. PCT/EP2021/079457. (2 pages).
(Continued)

*Primary Examiner* — Sean P Cullen
(74) *Attorney, Agent, or Firm* — Seed Intellectual Property Law Group LLP

(57) ABSTRACT

A method for producing a fuel cell stack includes: providing and individual handover of a plurality of first layers of the fuel cell stack, provided with overhangs, to a first conveyor belt pair which is motor driven and revolves around a first end, the two individual revolving conveyor belts of which run spaced apart so that they respectively receive one of the overhangs of the first layer, providing and individual handover of a plurality of second layers of the fuel cell stack, provided with overhangs, to a second conveyor belt pair which is motor driven and revolves around a second end, the two individual revolving conveyor belts of which run spaced apart so that they respectively receive one of the overhangs of the second layer, and handover of the first layers provided with overhangs at the first end of the first conveyor belt pair to a region of the conveyor belts of the second conveyor belt pair lying between two second layers transported by the second conveyor belt pair. A device for carrying out the method is also provided.

10 Claims, 2 Drawing Sheets

(58) Field of Classification Search
USPC .......................................................... 429/535
See application file for complete search history.

(56) References Cited

FOREIGN PATENT DOCUMENTS

| DE | 102020106045 A1 | | 9/2021 |
|----|----------------|---|--------|
| EP | 2204343 A1 | | 7/2010 |
| JP | 2010113997 A | | 5/2010 |
| JP | 2017130270 A | * | 7/2017 |
| WO | WO 2009006220 A1 | | 1/2009 |
| WO | WO 2014072704 A2 | | 5/2014 |

OTHER PUBLICATIONS

Written Opinion of the International Searching Authority, mailed Feb. 4, 2022, for International Patent Application No. PCT/EP2021/079457. (6 pages).

* cited by examiner

METHOD AND DEVICE FOR PRODUCING A FUEL CELL STACK BY CONVEYING FUEL CELL LAYERS ALONG BELTS VIA OVERHANGS

BACKGROUND

Technical Field

Embodiments of the invention relate to a method and device for producing a fuel cell stack of a fuel cell device.

Description of the Related Art

Fuel cell devices are used for the chemical transformation of a fuel with oxygen to form water in order to create electric energy. For this, fuel cells contain as their key component the so-called membrane electrode assembly (MEA), which is an assemblage of a proton-conducting membrane and an electrode arranged on either side of the membrane (anode and cathode). Furthermore, gas diffusion layers (GDL) may be arranged on either side of the membrane electrode unit at the sides of the electrodes facing away from the membrane. In operation of the fuel cell device having a plurality of fuel cells assembled into a fuel cell stack, the fuel, especially hydrogen $H_2$ or a gas mixture containing hydrogen, is supplied to the anode, where an electrochemical oxidation of $H_2$ to $H^+$ takes place, giving off electrons. Through the electrolyte or the membrane which separates the reaction spaces from each other in gas-tight manner and electrically insulates them, a transport of the protons $H^+$ from the anode space to the cathode space occurs. The electrons provided at the anode are taken by an electrical line to the cathode. The cathode is supplied with oxygen or a gas mixture containing $O_2$, so that a reduction of $O_2$ to $O^{2-}$ occurs, taking up electrons. At the same time, these oxygen anions react in the cathode space with the protons transported across the membrane to form water.

The reactant gases are supplied to the electrodes of the fuel cells by means of bipolar plates. In addition to the reactant gases, a cooling medium is also taken through the bipolar plates on account of the heat generated during the fuel cell reaction, so that three different media are taken through the bipolar plates in the smallest of spaces.

When supplying the fuel cells with the reactants, these are taken by main ducts (ports) to the bipolar plates, which is supposed to bring about a distribution of the reactants in an active region, in order to supply the entire surface of the electrodes as evenly as possible by means of a flow field. Since multiple bipolar plates are stacked with the membrane electrode units in the fuel cell stack, seals are used in order to seal off the main ducts along the fuel cell stack. In addition, a good sealing effect against the cooling medium flowing in coolant ducts must occur.

The stacking of the membrane electrode assemblies and the bipolar plates to produce the fuel cell stack is slow, costly, and ineffective. The two fuel cell components have to be oriented with high precision on each other, so that the supply openings and also the active regions provided in the components lie exactly on one another. For the stacking of the components, the membrane electrode assemblies and bipolar plates are generally suctioned, picked up and set down by corresponding handling apparatus such as robots or gantries. The cycle times for this process are relatively long and the investment expense for such a stacking layout is very high.

From DE 10 2018 116 057 A1 there is known an assembly layout in which membrane electrode assemblies and bipolar plates are alternately stacked by automation to form a fuel cell stack. In this case, the membrane electrode assemblies and bipolar plates are provided alternately on a single conveyor belt, a pressurized air device being used to place the individual layers of the fuel cell on a height-adjustable stack receiver. An assembly layout in which membrane electrode assemblies and bipolar plates are stacked alternately on one another is also known from DE 10 2015 220 399 A1, where a suction grip is used for the individual stacking of the fuel cell stack. From WO 2014/072 704 A2 there is known a kind of belt system in which membrane electrode assemblies and bipolar plates are placed or arranged in a common strip, which is then folded up to form a fuel cell stack.

BRIEF SUMMARY

Some embodiments provide a device and a method for producing a fuel cell stack in which the cycle times for the production of the fuel cell stack can be further reduced.

In some embodiments, a method includes:
providing and individual handover of a plurality of first layers of the fuel cell stack, provided with overhangs, to a first conveyor belt pair which is motor driven and revolves around a first end, the two individual revolving conveyor belts of which run spaced apart so that they respectively receive one of the overhangs of the first layer,
providing and individual handover of a plurality of second layers of the fuel cell stack, provided with overhangs, to a second conveyor belt pair which is motor driven and revolves around a second end, the two individual revolving conveyor belts of which run spaced apart so that they respectively receive one of the overhangs of the second layer, and
handover of the first layers provided with overhangs at the first end of the first conveyor belt pair to a region of the conveyor belts of the second conveyor belt pair lying between two second layers transported by the second conveyor belt pair.

In this way, therefore, two different delivery mimics are used each time to transport one of the layers, namely, either the bipolar plates or the membrane electrode assemblies, one of the two conveyor belt pairs ending prior to the other one and thus handing off its layers to this other conveyor belt pair. In this way, the two different conveyor belt pairs are used to combine the individual layers alternately and assemble them to form the fuel cell stack.

In this regard, it may be advantageous for the conveyor belts of the second conveyor belt pair to be led through openings of a ramp punch, and for the first layers and the second layers of the fuel cell stack to be stacked alternately on the ramp punch. Such a ramp punch can thus generate a back pressure with which the individual layers of the fuel cell stack run against each other and are already partially compressed and stacked.

It may be advantageous for the ramp punch to be designed to receive a unipolar plate, so that a unipolar plate can at first be placed on the ramp punch, and only then the first layers and the second layers of the fuel cell stack can be stacked alternately on the unipolar plate, held on the ramp punch. Thus, the back pressure is created by the ramp punch in cooperation with the unipolar plate, being additionally furthered by the advancing movement of the two conveyor belt pairs. When a sufficient number of individual layers of the fuel cell stack have been stacked, a second unipolar plate can be mounted as the termination. The two unipolar plates can then be braced against each other to form the finished fuel cell stack.

In order to assure the desired distances of the individual layers from each other, it may be advantageous for the conveyor belts to comprise equidistantly arranged structures by which the layers provided with overhangs are received. These structures may be elevations, for example, and the structures can also be actively adjustable between an expanded and a retracted position, especially when they are close to a ramp punch or close to the beginning of the stack. Furthermore, it is possible for the structures to be used to push or place the overhangs onto a further means of conveyance, so that a defined position of the individual media ports of the individual layers of the fuel cell stack can be achieved.

It is moreover possible for the first layers and/or the second layers to be provided lying flat on a delivery belt, the overhangs sticking out to the side relative to the direction of movement of the delivery belt, and for each one of the conveyor belts to be moved laterally with respect to the direction of movement of the delivery belt so that the equidistantly arranged structures receive and transport the layers at their overhangs, especially hanging down.

The benefits, embodiments and effects explained in connection with methods described herein hold equally for devices described herein for the production of such a fuel cell stack.

This comprises in particular a first conveyor belt pair which is motor driven and revolves around a first end, the two individual revolving conveyor belts of which run spaced apart so that a plurality of first layers of the fuel cell stack provided with overhangs can be transported between the conveyor belts at discrete intervals. Moreover, this comprises in particular a second conveyor belt pair which is motor driven and revolves around a second end, the two individual revolving conveyor belts of which run spaced apart so that a plurality of second layers of the fuel cell stack provided with overhangs can be transported between the conveyor belts at discrete intervals. The first end of the first conveyor belt pair may be positioned such with respect to the second conveyor belt pair that the first layers provided with overhangs are handed over to a region of the conveyor belts of the second conveyor belt pair lying between two of the second layers transported by the second conveyor belt pair.

In this way, an especially efficient, alternating stacking of the individual layers is realized, namely, the bipolar plates and the membrane electrode assemblies, at the same time achieving a reduction in the cycle time for the production of a fuel cell stack.

In this regard, it may be advantageous for the second conveyor belt pair to be led through openings of a ramp punch, which is adapted to alternately stack the first layers and the second layers of the fuel cell stack. Thanks to these openings, it is possible for the ramp punch to provide a back pressure for the individual layers transported, and moreover the ramp punch can be provided with corresponding guide structures in order to bring about the orderly, targeted stacking of the individual layers.

It may be advantageous moreover for the ramp punch to be adapted to hold a unipolar plate, on which the first layers and the second layers of the fuel cell stack can be stacked alternately. In this way, it is not necessary to mount the unipolar plate at one end afterwards, since this is already provided from the start, and only the second unipolar plate has to be provided in order to clamp it together with the first unipolar plate held on the ramp punch.

The conveyor belts may comprise equidistantly arranged structures, which are adapted to carry along and/or receive the layers provided with overhangs, it being possible for the equidistantly arranged structures to also be present adjustably on the individual conveyor belts, so that they can be converted to a retracted configuration at the uppermost layer of the existing stack or close to the ramp punch, in order to easily pass through the openings of the ramp punch.

It is not absolutely necessary for the structures to be actively adjustable, so that an elastic configuration of the structures can also be realized, i.e., a formation of the structures from an elastomer, for example, especially as a single piece with the particular conveyor belt. In this way, the overhangs of the individual layers, namely the overhangs of the bipolar plates and the overhangs of the membrane electrode assemblies, can slide over the elastic structures when they arrive at the ramp punch.

Typically, the individual layers of the membrane electrode assemblies are placed flat on substrates or produced in a decal process. Thus, the membrane electrode assemblies, as well as the bipolar plates, may be transported and provided flat. In this regard, it may be advantageous for the first layers and/or the second layers to be provided lying flat on a delivery belt, the overhangs sticking out to the side relative to the direction of movement of the delivery belt, and for each one of the conveyor belts to be moved laterally with respect to the direction of movement of the delivery belt so that the equidistantly arranged structures receive and transport the layers at their overhangs, especially hanging down.

Thus, in this way, a swiveling of the individual layers is produced, namely, a 90 degree rotation or an upright placement. Thus, it is possible to orient the two delivery mimics relative to each other such that they push one of the two layers in the direction of gravity, from above, between two of the other two layers. For this, one of the conveyor belt pairs runs at an angle relative to the other of the conveyor belt pairs.

The features and combinations of features mentioned above in the description as well as the features and combinations of features mentioned below in the description of the figures and/or shows solely in the figures can be used not only in the particular indicated combination, but also in other combinations or standing alone. Thus, embodiments not shown or explained explicitly in the figures, yet deriving and producible from the explained embodiments by separated combinations of features shall also be deemed to be encompassed and disclosed by the present disclosure.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
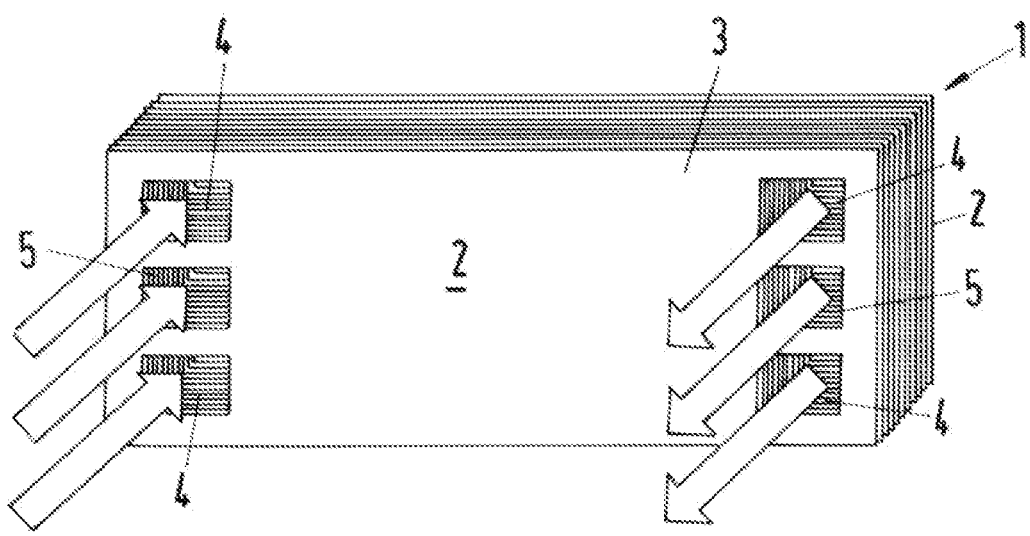
FIG. 1 shows a schematic representation of a fuel cell stack comprising a plurality of fuel cells with the bipolar plates showing the main ducts.

A fuel cell stack 1 shown in FIG. 1 consists of a plurality of fuel cells 2 switched in a row. Each of the fuel cells 2 comprises an anode and a cathode as well as a proton-conducting membrane separating the anode from the cathode. The two electrodes together with the membrane form a membrane electrode assembly 7 (MEA). The membrane is formed from an ionomer, such as a sulfonated tetrafluoroethylene polymer (PTFE) or a polymer of perfluorinated sulfonic acid (PFSA). Alternatively, the membrane can be formed as a sulfonated hydrocarbon membrane.

Through anode spaces inside the fuel cell stack 1 fuel is supplied to the anodes (for example, hydrogen). In a polymer electrolyte membrane fuel cell (PEM fuel cell), fuel or fuel molecules are split into protons and electrons at the anode. The membrane lets through the protons (for example, $H^+$), but it is not permeable to the electrons ($e^-$). At the anode the following reaction occurs: $2H_2 \rightarrow 4H^+ + 4e^-$ (oxidation/electron surrender). While the protons pass through the membrane to the cathode, the electrons are taken by an external circuit to the cathode or to an energy accumulator. Through cathode spaces inside the fuel cell stack 1 the cathodes can be supplied with cathode gas (such as oxygen or air containing oxygen), so that the following reaction occurs at the cathode side: $O_2 + 4H^+ + 4e^- \rightarrow 2H_2O$ (reduction/electron uptake).

Air compressed by a compressor is supplied to the fuel cell stack 1 by a cathode fresh gas line. In addition, the fuel cell stack 1 is connected to a cathode exhaust gas line. At the anode side, hydrogen kept in a hydrogen tank is supplied to the fuel cell stack 1 by an anode fresh gas line in order to provide the reactants needed for the electrochemical reaction in a fuel cell 2. These gases are handed over to bipolar plates 3, which comprise main ducts 4 (ports) for the distribution of the gases to the membrane and the exit line. In addition, the bipolar plates 3 comprise main coolant ducts 5 (ports) for the channeling of a cooling medium in a coolant duct 5, so that three different media are carried in the smallest of spaces. FIG. 1 furthermore shows the main ducts 4, 5 respectively combined into pairs of a plurality of fuel cells 2 with bipolar plates 3 forming the fuel cell stack 1. The ports are also present in the membrane electrode assemblies 7, and seals are present to guard the operating media and the cooling medium from an unwanted leakage from the stack.

In the fuel cell stack 1 the membrane electrode assemblies 7 and the bipolar plates 3 are arranged alternating such that they are oriented as exactly as possible to each other. In particular, the supply openings and also the seals should be arranged exactly aligned with each other, in order to form and seal off the main supply ducts interpenetrating the stack in the stacking direction. But also the active regions (catalytic electrodes and flow fields) should be oriented congruent to each other, in order to produce the contact between the operating media supplied through the bipolar plate 3 and the active centers of the catalytic electrode and maximize the active region.

Figure 2:
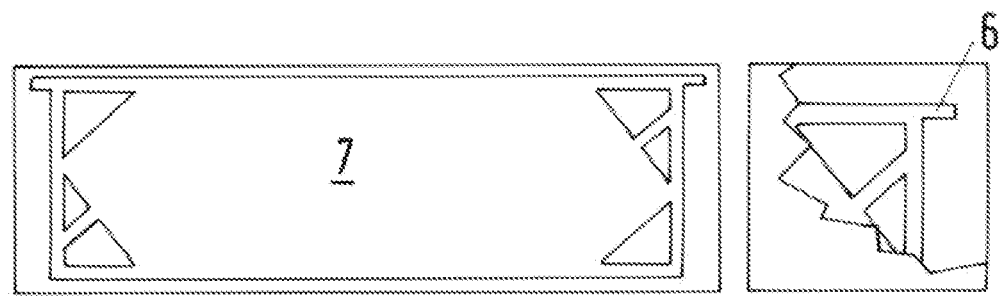
FIG. 2 shows a schematic representation of a membrane electrode assembly as one of the layers of the fuel cell, including a detail view of the overhang present there.
Figure 3:
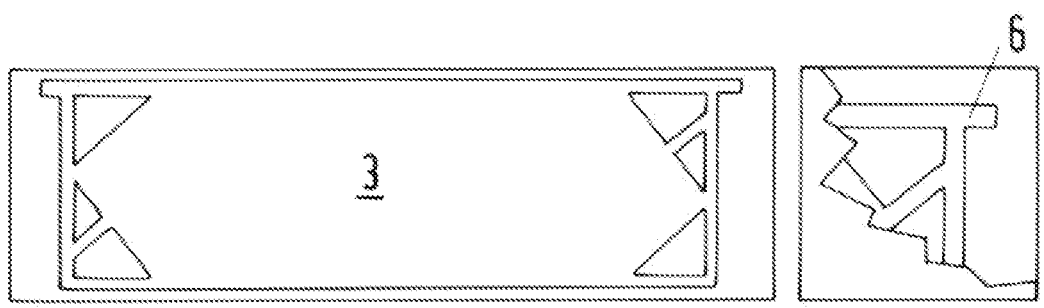
FIG. 3 shows a schematic representation of a bipolar plate as one of the layers of the fuel cell, including a detail view of the overhang present there.

In FIG. 2 one can see that the membrane electrode assemblies 7 described herein have been increased with an overhang 6, which has been produced either as a single piece with the rest of the material of the membrane electrode assembly 7 or has been added afterwards. These overhangs 6 present on the left and right side of this layer of the fuel cell are used to manipulate the layer. Accordingly, FIG. 3 also shows the increasing of the bipolar plate 3 with the overhangs 6 present on both sides.

Figure 4:
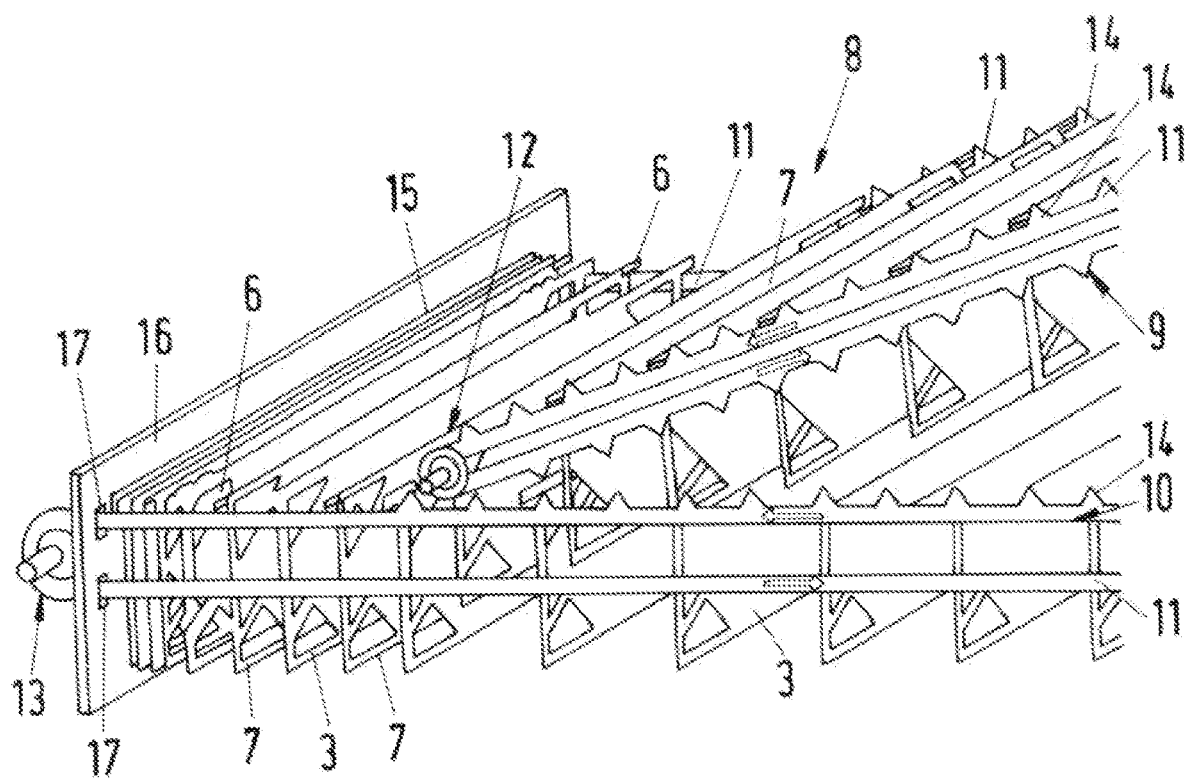
FIG. 4 shows a schematic view of the device for the production of the fuel cell stack.

FIG. 4 shows a device 8 for the production of a fuel cell stack 1, comprising a first conveyor belt pair 9 which is motor driven and revolves around a first end 12, the two individual revolving conveyor belts 11 of which run spaced apart so that a plurality of first layers 3, 7 of the fuel cell stack 1 provided with overhangs 6 can be transported between the conveyor belts 11 at discrete intervals. This first conveyor belt pair 9 runs at a slant relative to a second conveyor belt pair 10, which is motor driven and also revolves around a second end 13. These two individual revolving conveyor belts 11 run spaced apart so that a second layer 7, 3 of the fuel cell stack 1 provided with overhangs 6 is transported between the conveyor belts 11 at discrete intervals. The first end 12 of the first conveyor belt pair 9 is positioned such with respect to the second conveyor belt pair 10 that the first layers 3, 7 provided with overhangs 6 are handed over to a region of the conveyor belts 11 of the second conveyor belt pair 10 lying between two of the second layers 7, 3 transported by the second conveyor belt pair 10.

Thus, in the embodiment shown, each time a membrane electrode assembly 7 is inserted from above between every two bipolar plates 3 at the first end 12 and suspended in the second conveyor belt pair 10. The two conveyor belt pairs 9, 10, and especially their conveyor belts 11, comprise equidistantly arranged structures 14 which are adapted to carry along and/or take up the individual layers provided with overhangs 6. After the membrane electrode assembly 7 has been handed off to the second conveyor belt pair 10 between every two bipolar plates 3, each of the conveyor belts 11 of the second conveyor belt pair 10 runs through openings 17 of a ramp punch 16, thereby producing a back pressure which alternately stacks the individual layers 3, 7 of the fuel cell in automated manner.

In order to make the manufacturing of the fuel cell stack 1 even faster and thereby reduce the cycle times, the ramp punch 16 is adapted furthermore to provide and hold a unipolar plate 15, on which the individual layers 3, 7 are stacked alternately. The structures 14 of the second conveyor belt pair 10 can be retracted, for example, or they can be formed elastic, so that they can pass through the through holes 17. Another option is to configure the ramp punch 16 with a suitable (extra) guide, so that the structures 14 push the overhangs 6 of the individual layers onto this (extra) guide and thus make possible a relative movement between the structures 14 and the individual layers 3, 7 of the fuel cell.

Since the bipolar plates 3 and also the membrane electrode assemblies 7 are transported in a recumbent, and thus flat position during their manufacture, it may be advantageous for them to be provided by means of a delivery belt such that the overhangs 6 are sticking out to the side relative to the direction of movement beyond the delivery belt, and for each one of the conveyor belts 11 to be moved laterally with respect to the direction of movement of the delivery belt so that the equidistantly arranged structures 14 receive and transport the layers at their overhangs, especially hanging down, being also alternately interleaved handing down and alternately collected on the ramp punch 16.

Thus, the method and the device described herein are distinguished by a distinct reduction in cycle time for the production of multiple fuel cell stacks 1.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a fuel cell stack, comprising:
carrying out individual handover of a plurality of first layers of the fuel cell stack to a first pair of individual revolving conveyor belts that are motor driven and revolve around a first end, wherein each of the plurality of first layers are provided with an opposing pair of overhangs that extend outwardly from opposing lateral sides of the first layer, and wherein the first pair of individual revolving conveyor belts run spaced apart so that each of the first pair of individual revolving conveyor belts respectively receives one of the opposing pair of overhangs of each first layer of the fuel cell stack;
carrying out individual handover of a plurality of second layers of the fuel cell stack to a second pair of individual revolving conveyor belts that are motor driven and revolve around a second end, wherein each of the plurality of second layers are provided with an opposing pair of overhangs that extend outwardly from opposing lateral sides of the second layer, and wherein the second pair of individual revolving conveyor belts run spaced apart so that each of the second pair of individual revolving conveyor belts respectively receive one of the opposing pair of overhangs of each second layer of the fuel cell stack; and
carrying out handover of the plurality of first layers at the first end of the first pair of individual revolving conveyor belts to a region of the second pair of individual revolving conveyor belts to position each of the plurality of first layers between a respective pair of the plurality of second layers that are transported by the second pair of individual revolving conveyor belts.

2. The method according to claim 1, wherein each of the second pair of individual revolving conveyor belts are led through openings of a ramp punch, and the plurality of first layers and the plurality of second layers of the fuel cell stack are stacked alternately on the ramp punch.

3. The method according to claim 2, wherein a unipolar plate is first placed on the ramp punch, and then the plurality of first layers and the plurality of second layers of the fuel cell stack are stacked alternately on the unipolar plate held on the ramp punch.

4. The method according to claim 1, wherein each of the first pair of individual revolving conveyor belts and each of the second pair of individual revolving conveyor belts comprise equidistantly arranged structures by which the plurality of first layers and the plurality of second layers are received.

5. The method according to claim 4, wherein the plurality of the first layers and/or the plurality of the second layers are provided lying flat with the overhangs thereof extending outwardly relative to a direction of movement, and each one of the first pair and/or second pair of individual revolving conveyor belts is moved laterally with respect to the direction of movement so that the equidistantly arranged structures receive and transport the plurality of first layers and/or the plurality of second layers at their overhangs.

6. A device for producing a fuel cell stack, comprising:
a first pair of individual revolving conveyor belts that are motor driven and revolve around a first end, each of the first pair of individual revolving conveyor belts of which run spaced apart so that a plurality of first layers of the fuel cell stack can be transported between the first pair of individual revolving conveyor belts at discrete intervals, wherein each of the plurality of first layers include an opposing pair of overhangs that extend outwardly from opposing lateral sides of the first layer;
a second pair of individual revolving conveyor belts that are motor driven and revolve around a second end, each of the second pair of individual revolving conveyor belts of which run spaced apart so that a plurality of second layers of the fuel cell stack can be transported between the second pair of individual revolving conveyor belts at discrete intervals, wherein each of the plurality of second layers include an opposing pair of overhangs that extend outwardly from opposing lateral sides of the second layer;
wherein the first end of the first pair of individual revolving conveyor belts is positioned with respect to the second pair of individual revolving conveyor belts such that the plurality of first layers are handed over to a region of the second pair of individual revolving conveyor belts to position each of the plurality of first layers between a respective pair of the plurality of second layers that are transported by the second pair of individual revolving conveyor belts.

7. The device according to claim 6, wherein each of the second pair of individual revolving conveyor belts is led through openings of a ramp punch, which is adapted to alternately stack the plurality of first layers and the plurality of second layers of the fuel cell stack.

8. The device according to claim 7, wherein the ramp punch is adapted to hold a unipolar plate, on which the plurality of first layers and the plurality of second layers of the fuel cell stack are stacked alternately.

9. The device according to claim 6, wherein each of the first pair of individual revolving conveyor belts and each of the second pair of individual revolving conveyor belts comprise equidistantly arranged structures, which are adapted to carry along and/or receive the plurality of first layers and/or the plurality of second layers.

10. The device according to claim 9, wherein the plurality of first layers and/or the plurality of second layers are provided lying flat with the overhangs thereof extending outwardly relative to a direction of movement, and each one of the first pair and/or second pair of individual revolving conveyor belts is moved laterally with respect to the direction of movement so that the equidistantly arranged structures receive and transport the plurality of first layers and/or the plurality of second layers at their overhangs.

* * * * *